United States Patent
Hernacki et al.

(10) Patent No.: US 8,256,013 B1
(45) Date of Patent: Aug. 28, 2012

(54) METHOD AND APPARATUS FOR DYNAMIC CREATION OF PERSONA

(75) Inventors: Brian Hernacki, San Carlos, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 983 days.

(21) Appl. No.: 11/644,537

(22) Filed: Dec. 22, 2006

(51) Int. Cl.
*H04L 29/06* (2006.01)

(52) U.S. Cl. ............... 726/28; 726/3; 726/11; 726/25; 709/225

(58) Field of Classification Search ........... 707/3, 9, 707/10, 100; 715/733, 738, 741; 726/3, 726/11, 25, 28; 709/225
See application file for complete search history.

(56) References Cited

U.S. PATENT DOCUMENTS

| | | | |
|---|---|---|---|
| 7,549,125 B2* | 6/2009 | Dunn et al. | 715/739 |
| 2002/0116243 A1* | 8/2002 | Mancisidor et al. | 705/7 |
| 2006/0253581 A1* | 11/2006 | Dixon et al. | 709/225 |

* cited by examiner

*Primary Examiner* — Farid Homayounmehr
*Assistant Examiner* — Hee Song
(74) *Attorney, Agent, or Firm* — Wilmer Cutler Pickering Hale and Dorr LLP

(57) ABSTRACT

A method and apparatus for dynamically generating a persona is provided. In one embodiment, the method includes receiving an identity policy, determining a required identity information data set based on the policy, requesting a site reputation, receiving the site reputation, determining a set of site reputation parameters, and generating a persona based on the required identity information data set and the site reputation parameters.

20 Claims, 2 Drawing Sheets

METHOD AND APPARATUS FOR DYNAMIC CREATION OF PERSONA

BACKGROUND OF THE INVENTION

1. Field of the Invention

The present invention generally relates to computers and, more particularly, to techniques for dynamically generating persona.

2. Description of the Background Art

Interacting with internet sites or service providers often involves disclosing some personal information. Users often desire to only disclose the minimal information required to interact with a given site or service provider. How a given site or service provider is known to use the information supplied by a user, their reputation, can also affect how much personal information a user may wish to provide to the given site or service provider. In some cases, users may desire to limit how information given to one site or service provider is tied to information given to other sites or service providers by giving each site or service provider different user identities to prevent identity correlation between the sites and/or service providers.

A lot of effort can be expended to generate and store different sets of user identity information such as user names, passwords, e-mail addresses and the like. The practice of creating multiple sets of user identities is known as creating different persona. Some users may become frustrated with the required record keeping associated with having multiple persona.

There may also be confusion surrounding the minimum required personal identity data set each persona must include to satisfy a particular site or service provider identity policy requirement. For example, two different sites may each ask a user to supply the same personal data prior to the user gaining access to the site content. Even though both sites ask for the same personal data, one site may only require a unique user name and password while the other site may require additional information such as a home address, social security number, and the like. Neither site may identify what the minimum required identity data set needs to be, so the user can be left to guess.

Some service providers use identity management protocols such as the software distributed under the trademarks CARDSPACE and OPEN ID. CARDSPACE and OPEN ID allow users to provide their digital persona in a familiar, secure, and easy manner. Using identity management protocols allows users to create a variety of persona to electronically identify themselves to service providers.

A single user may have multiple persona. For example, a user may have a work persona, a personal persona, an internet relay chat (irc) persona, a gaming persona, and the like. One reason persona are used is to limit information correlation between sites, groups of sites, or service providers. In other words, it is hard to connect the activities of a user who has a work persona having an e-mail address of BobSmith@abccompany.com and a gaming persona with a gaming screen name of "ClownOverlord." Even though these persona come from the same person, as long as the user consistently uses each persona for work and gaming respectively, there identity should be more secure than if they used the same persona for each activity. While there may be a need for legal recourse to trace both persona to the same entity, for most interaction purposes the use of persona is accepted and justified. It should be understood that many service providers employ multiple internet sites and use these multiple sites to correlate user information. It can therefore be important for users to use different persona with various sites even though the sites may be owned by, managed by, or share data with the same service provider.

While persona do in general solve the problem of information correlation and/or keeping a given user identity private, again it is not easy to create multiple persona. Minimally, it takes the effort to manually enter the information into a given identity management protocol for each given site. If the user is required to provide more than a user name and password to the site, for example information such as phone number, shipping address, or other out-of-band data, the user may also need to provide this information.

Additionally, the user often lacks information about the reputation of a particular site or service provider. Without access to the reputation information of a site, the user may have to guess what identity information they need to provide to a site to protect their real identity. For example, the user may wonder if it is acceptable to supply a work e-mail address to a given site or will that site start sending spam to the work address or sell the address to other spammers? These problems inhibit the use of persona.

Therefore, there is a need in the art for a method and apparatus that facilitates effective use of persona.

SUMMARY OF THE INVENTION

A method and apparatus for dynamically generating persona is provided. In at least one specific embodiment of the invention, the method includes receiving an identity policy, determining a required identity information data set based on the policy, requesting a site reputation, receiving the site reputation, determining a set of site reputation parameters, and generating a persona based on the required identity information data set and the site reputation parameters.

BRIEF DESCRIPTION OF THE DRAWINGS

So that the manner in which the recited features of the present invention can be understood in detail, a more particular description of the invention, briefly summarized below, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must).

Similarly, the words "include," "including," and "includes" mean including, but not limited to.

DETAILED DESCRIPTION

A method and apparatus for dynamically generating persona is provided. The method and apparatus allow users to set preferences regarding the personal information or particular persona that the user wants to provide to a given service provider or internet site based on the service provider or internet site reputation. In one or more embodiments, the preferences as to which persona to share with a given site can be based on information about the site, such as what type of services the site provides. For example, the user can set preferences for providing different persona to different gaming, travel, adult entertainment, banking, or any available sites so their user identity can be kept private. In one or more embodiments, the user preferences can be based on the site or service provider spam reputation or abuse of user data reputation.

Other site reputation data can include but is not limited to, the data sharing policy of the site, the political orientation of the site organization, the cost of the services provided, or any reputation data imaginable regarding a given site. For example, if the user is interacting with a gaming site, the user may chose to use a screen name, e-mail address, game preferences, and other personal preference attributes appropriate for the particular game. Accordingly, a user can vary the persona they provide to different sites based on the type of service the user is interacting with.

In one or more embodiments, a user persona can be dynamically generated. In at least one specific embodiment the method includes, receiving an identity policy, determining a required identity information data set based on the policy, requesting a site reputation, receiving the site reputation, determining a set of site reputation parameters, and generating a persona based on the required identity information data set and the site reputation parameters.

Figure 1:
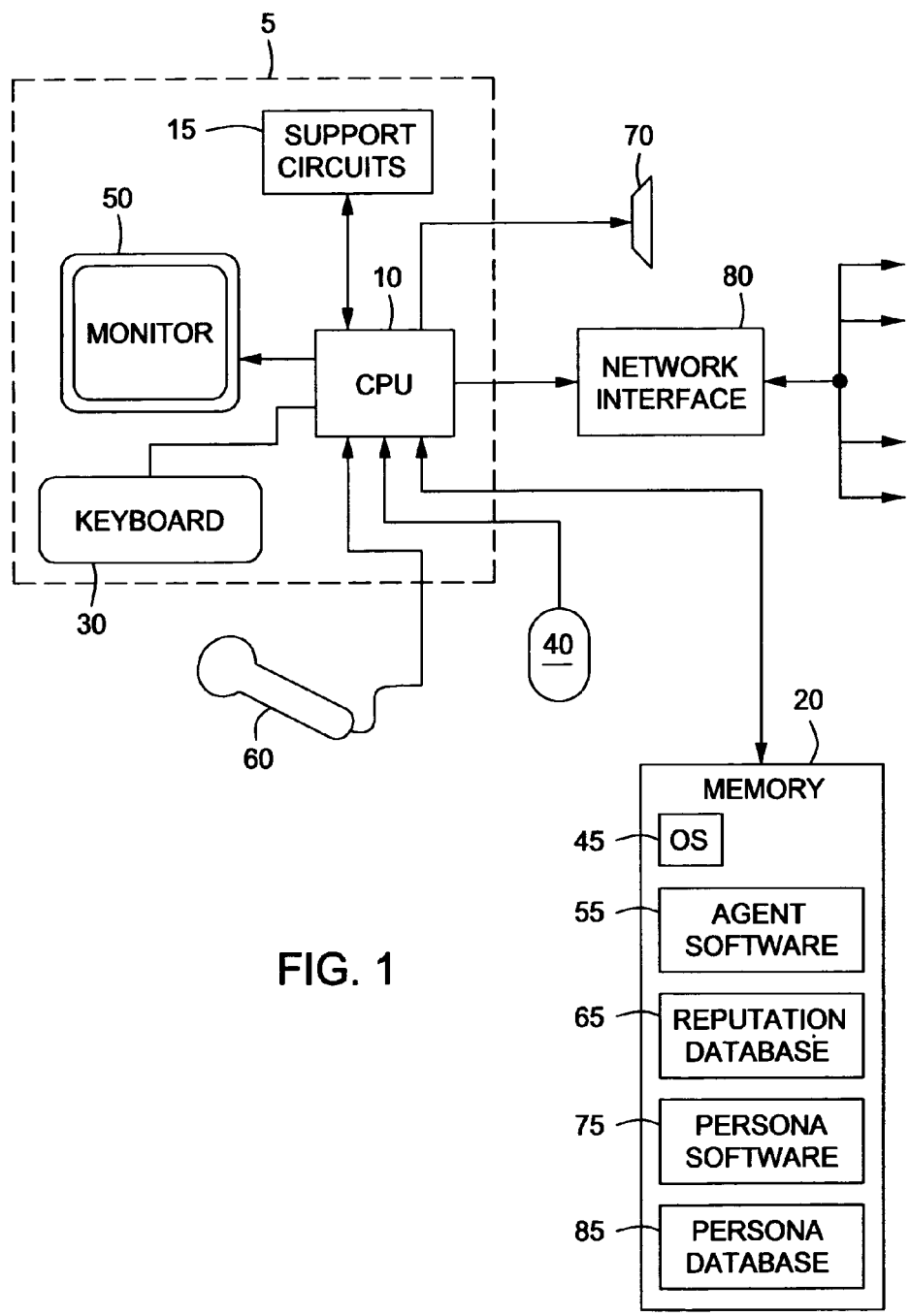
FIG. 1 depicts a representative computer system used to perform at least one embodiment of the invention.

FIG. 1 depicts a representative computer system used to perform at least one embodiment of the invention. Those skilled in the art will understand that there are many computer systems configurations and variations and it should be understood that the computer system 5 presented in FIG. 1 is not meant to limit the configurations within which the many embodiments, as described below, can be employed. The computer 5 comprises at least one central processing unit (CPU) 10, input/output devices 30, 60, 70, support circuits 15, memory 20 and a monitor 50. The input/output devices, for example, comprise one or more of a keyboard 30, a mouse 40, a microphone 60 and a speaker 70. The mouse 40, the microphone 60 and the speaker 70 may be used for, among other purposes, universal access and voice recognition or commanding. The monitor 50 may be touch sensitive to operate as an input device as well as a display device. The computer system 5 interfaces with external databases or the Internet via the network interface 80. It should be understood that the term "network interface" does not indicate a limitation to interfaces that use only Ethernet connections and refers to all possible external interfaces, wired or wireless.

It should be understood that even though the computer system 5 is shown as a platform on which the methods described can be performed, the methods described can be performed on any platform where users can interact with internet sites or service providers. For example, the many and varied embodiments described herein can be used on any device that has computing capability where users interact with service providers or Internet sites. These devices can include but are not limited to and are presented for illustrative purposes only, distributed computer networks, hand held PCs, laptops, devices sold under the trademark names BLACKBERRY or PALM, cellular phones, hand held music players, or any other device or system upon which a user can interact with service providers or internet sites.

Computer programs are stored in the memory 20 and the CPU 10 operates in concert with at least the memory 20, the input/output devices 30, the support circuits 15 and the monitor 50 to perform tasks for the user. The support circuits 15 comprise well-known circuits and devices that are used to facilitate functionality of the CPU 10. The support circuits comprise, for example, clock, circuits, cache, power supplies, and the like. The memory 20 includes any number and combination of memory devices, without limitation, as is currently available or can become available in the art. Such devices include without limitation, and for illustrative purposes only: hard drives, disk drives, random access memory, read only memory, electronically erasable programmable read only memory, flash memory, thumb drive, and any other memory device. Those skilled in the art are familiar with the many variations that can be employed using memory devices and no limitations should be imposed on the embodiments herein due to memory device configurations and algorithm prosecution techniques.

In one or more embodiments, the memory 20 stores an operating system (OS) 45, an agent software 55, a reputation database 65, a persona software 75, and a user persona database 85. It should be noted that the reputation database 65 and the user persona database 85 can be contained in the same database and the depiction in FIG. 1 is not a limitation to how the databases are structured.

The operating system 45 facilitates control and execution of software using the CPU 10. Any of the available operating systems may be used in this manner including WINDOWS, LINUX, Apple OS, UNIX and the like. In accordance with one embodiment of the invention, the CPU 10 can execute the persona software 75 when the agent software 55 executes an interface with a site. The persona software 75 analyzes a site identity policy and request the site reputation from a reputation service or other source of reputation data. After receiving the reputation data, the persona software 75 generates particular persona data for use by the user as an electronic identification for the given site. Details of the analysis process are described below.

The persona software 75 is software written using conventional programming techniques. It should understood that the persona software 75 and the agent software 55 can be separate software packages, can be called into execution by one software package 75, 55 or the other, can be a subroutine within one software package 75, 55 or the other, and/or can be incorporated into a single software package executable code.

In one or more embodiments, the persona software 75 can be an expert system. An expert system is a computer program designed to simulate the problem-solving behavior of a human or a team of interdisciplinary humans who are each expert in a narrow domain or discipline. An expert system can be composed of a knowledge base, for example a reputation database 65 and/or a persona database 85, and an inference engine for analyzing the knowledge base. In one or more embodiments, the expert system based persona software 75 analyzes a site identity policy, request the site reputation from a reputation service, receive the reputation, and generate a dynamic persona based on the identity policy and reputation.

One attribute of an expert system can be the ability to save the logical chain of reasoning it uses to generate a given recommendation or solution. In one or more embodiments, the expert system, persona software 75 provides to the user the factors it considered in creating a given persona. This attribute enhances user confidence in the created persona and acceptance of the persona software 75.

It should be understood that, in one or more embodiments, the agent software 55 includes the internet browser software packages distributed under the Trademark names INTERNET EXPLORER, NETSCAPE, MOZILLA, FIRE FOX, SAFARI, or any software package capable of executing a user request to interface with a site or service provider. It should also be understood that the word "site" is not limited to internet sites and can include any electronically accessible data location available to a user over a network interface 80. It should be understood that the word "network" is not limited to a computer network and can include cell phone networks, intranets, extranets or any electronically accessible data sharing environments.

Figure 2:
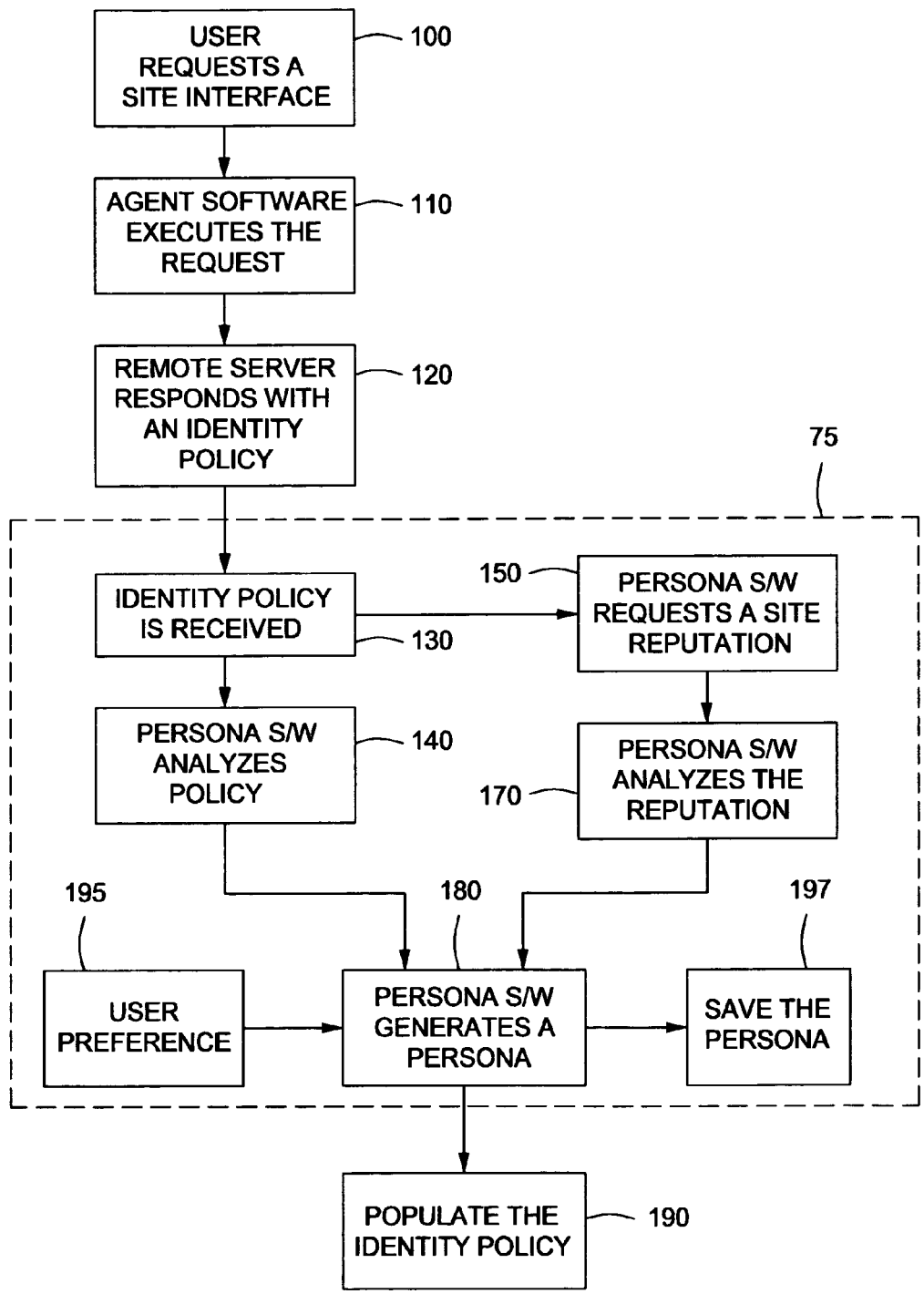
FIG. 2 depicts a flow diagram illustrating an embodiment of a method for dynamically generating persona in accordance with the present invention.

FIG. 2 depicts a flow diagram illustrating an embodiment of a method for dynamically generating persona.

At step 100, a user decides to connect to a particular site, by requesting the site interface. At step 110, the agent software executes the request. Where the site requires the user to respond with user identifying data, at step 120, the site remote server responds with an identity management policy or any policy specifying what information the user should provide. The site may allow for the use of the identity management protocol/system CARDSPACE or OPEN ID, as part of the site policy. After the policy is received, at step 140, the persona software 75 analyzes the policy to determine the required identity information data set that must be sent to the site for the site to allow the user to access the site contents. For example, does the site require a user name, password, e-mail address, mailing address, and the like.

At step 150, the persona software 75 requests a site reputation from a reputation database, for example, the reputation database 65 with reference to FIG. 1 above. In one or more embodiments, the reputation database 65 is resident in the memory 20 (i.e., locally), is queried from a database over the network interface 80, and/or is queried from a site reputation service provider available in the market, for example over the internet. Alternatively, the reputation service may supply reputation data to the local reputation database 65 in a manner similar to spam or virus filter definitions are supplied to a local database.

The site reputation data indicates particular trustworthiness attributes about the site such as "safe", "not safe", "anonymous response recommended", or any attributes that indicate how much personal data a user should give to a particular site. At step 195, the user sets preferences in the persona software 75 to instruct the persona software 75 to generate persona based on the site trustworthiness. For example, if the reputation data indicates that a site is not safe, the user can set a preference instructing the persona software 75 to generate a completely anonymous persona for all sites that are not safe.

The site reputation data also includes general reputation information about site SPAM habits, data sharing habits, data abuse complaints, the type of services provided, or any other information pertaining to site reputation. The user can set preferences in the persona software 75 to instruct the persona software 75 to generate persona based on any reputation information about a site and/or service provider. How the site reputations are determined and the nature of the reputation service is not important for the purposes of the embodiments described herein.

After receiving the reputation data, at step 170, the persona software 75 analyzes the reputation based on the received reputation data (step 170). Based on the site reputation analysis and the policy analysis, at step 180, the persona software 75 then recommends and/or generates a persona to meet the identity policy based on the analyses from steps 170 and 140 respectively. The actual policy transaction specifics are performed relative to the identity management protocol/system being used.

At step 190, the agent then populates the identity policy using the persona from step 180 and provides this persona to the site. At step 197, the persona software 75 also saves the persona for future use. For example, the persona software 75 saves the persona specific user name and password so the next time the user wishes to enter a site, the persona software automatically completes, for example, the user name and password required by the site. The persona software 75 saves the persona specific user name and password into the computer key-chain so the next time the user wishes to enter a site, the key-chain can automatically complete, for example, the user name and password required by the site, using means understood in the art. In another example, the persona software 75 saves the user persona for later recall by the user when the user wishes, for example, to reuse an existing persona and provide the existing persona to a site and/or service provider without using a new persona software 75 generated persona. In this way, the user does not have to remember all the different persona generated by the persona software 75 and manually uses previously generated persona if the user so desires. In another example, the persona software 75 saves the persona for use with multiple sites with whom the user wishes to interact. For example, the saved persona 197 is used with all work related communications, all home related communications, or with any contextually related communications the user defines.

At step 195, the user sets user preferences for how the user wishes the persona software 75 to generate a persona. For example, if the user wants an anonymous persona for all sites, the user sets a user preference instructing the persona software 75 to always return a different anonymous persona for every site. On the other hand, the user may set the user preference 195 such that the persona software 75 returns his true persona for all sites. The user may also set the user preference 195 such that the persona software 75 generates various persona or groups of persona based on site reputation or the service provided by a given site. For example, if the reputation information indicates the site is a gaming site, the user can set preferences to instruct the persona software 75 to generate a persona that uses a particular gaming related nickname or particular gaming related persona for all usernames, e-mail addresses, etc., supplied to each gaming site.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While, for the purposes of disclosure there have been shown and described what are considered at present to be illustrative, example embodiments of the present invention; it will be appreciated by those skilled in the art that other uses can be resorted to and changes can be made to the example embodiment details or characteristics without departing from the spirit and scope of the invention. The fact that any illustrative list is present in this disclosure does not intend a limitation on the present invention to those items listed. It is therefore desired that the invention not be limited to these embodiments and it is intended that the appended claims cover all such modifications as fall within this spirit and scope.

While the foregoing is directed to embodiments of the present invention, other and further embodiments of the invention can be devised without departing from the basic scope thereof, and the scope thereof is determined by the claims that follow.

What is claimed is:

1. A method for dynamically creating a persona comprising:
   receiving an identity policy;
   determining a required identity information data set based on the policy using at least one computer processor;
   requesting a site reputation;
   receiving the site reputation;
   determining a set of site reputation parameters, wherein the site reputation parameters are associated with a particular web site;
   evaluating the required identity information data set and the site reputation parameters to determine a privacy level;
   saving a logical chain of reasoning used to dynamically create the persona;
   dynamically creating a persona for use with the particular web site based on the required identity information data set and the site reputation parameters wherein the persona is created by combining one or more identifying characteristics to conform to a minimum required identity information data set for the particular web site, and wherein the one or more identifying characteristics of the persona are determined based upon the privacy level;
   providing to a user one or more factors used to select the identifying characteristics of the dynamically created persona; and
   saving the dynamically created persona to a mobile memory device, wherein the mobile memory device provides automatic completion of the minimum required identity information data set for the particular web site in response to a user request.

2. The method of claim 1 wherein the persona is generated by a persona software.

3. The method of claim 2 wherein the persona software is an expert system.

4. The method of claim 1 further comprising saving the persona for future use.

5. The method of claim 1 further comprising:
   a user preference; and
   wherein generating a persona is based on the required identity information data set, the user preference, and the site reputation parameters.

6. The method of claim 1 wherein the site reputation is accessed from a site reputation database.

7. The method of claim 6 wherein the site reputation database comprises information regarding a trustworthiness of particular sites.

8. The method of claim 7 wherein the persona is based upon the trustworthiness.

9. The method of claim 8 wherein the trustworthiness comprises attributes including at least one of safe, not safe and anonymous response recommended.

10. A method for dynamically creating a persona comprising:
    receiving an identity policy;
    determining a required identity information data set based on the policy using at least one computer processor;
    requesting a site reputation;
    receiving the site reputation;
    determining a set of site reputation parameters, wherein the site reputation parameters are associated with a particular web site;
    evaluating the required identity information data set and the site reputation parameters to determine a privacy level;
    saving a logical chain of reasoning used to dynamically create the persona;
    dynamically creating a persona for use with the particular web site based on the required identity information data set and the site reputation parameters wherein the persona is created by an expert system combining one or more identifying characteristics to conform to the minimum required identity data set for the particular web site, and wherein the one or more identifying characteristics of the persona are determined based upon the privacy level;
    saving the persona for future use;
    providing to a user one or more factors used to select the identifying characteristics of the dynamically created persona; and
    saving the dynamically created persona to a mobile memory device, wherein the mobile memory device provides automatic completion of the minimum required identity information data set for the particular web site in response to a user request.

11. The method of claim 10 wherein the site reputation is accessed from a site reputation database.

12. The method of claim 11 wherein the site reputation database comprises information regarding a trustworthiness of particular sites.

13. The method of claim 12 wherein the persona is based upon the trustworthiness.

14. The method of claim 13 wherein the trustworthiness comprises attributes including at least one of safe, not safe and anonymous response recommended.

15. Apparatus for dynamically creating a persona comprising:
    means for receiving an identity policy;
    means for determining a required identity information data set based on the policy;
    a database of reputation data;
    means for requesting a site reputation from the database;
    means for receiving the site reputation;
    means for determining a set of site reputation parameters, wherein the site reputation parameters are associated with a particular web site;
    means for evaluating the required identity information data set and the site reputation parameters to determine a privacy level;
    means for saving a logical chain of reasoning used to dynamically create the persona;
    means for dynamically creating a persona for use with the particular web site based on the required identity information data set and the site reputation parameters wherein the persona is created by combining one or more identifying characteristics to conform to the minimum required identity data set for the particular web site, and wherein the one or more identifying characteristics of the persona are determined based upon the privacy level; means for providing to a user one or more factors used to select the identifying characteristics of the dynamically created persona; and
    means for saving the dynamically created persona to a mobile memory device, wherein the mobile memory device provides automatic completion of the minimum required identity information data set for the particular web site in response to a user request.

16. The apparatus of claim 15, further comprising:
a database of persona, and means for saving the generated persona for future use.

17. The apparatus of claim 15, further comprising:
a database of user preference data,
means for receiving the user preference data,
wherein the means for generating a persona, generates the persona based on the required identity information data set, the user preference, and the site reputation parameters.

18. The apparatus of claim 15 wherein the reputation database comprises information regarding the trustworthiness of particular sites.

19. The apparatus of claim 18 wherein the persona is based upon the trustworthiness.

20. The apparatus of claim 19 wherein the trustworthiness comprises attributes including at least one of safe, not safe and anonymous response recommended.

* * * * *